(12) United States Patent
Reguna et al.

(10) Patent No.: US 8,719,345 B2
(45) Date of Patent: May 6, 2014

(54) DATABASE REPLICATION USING COLLABORATIVE DATA TRANSFERS

(75) Inventors: Sudeep Reguna, Bangalore (IN); Feroz Alam Khan, Bangalore (IN); Kant C. Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 13/469,262

(22) Filed: May 11, 2012

(65) Prior Publication Data

US 2013/0304816 A1    Nov. 14, 2013

(51) Int. Cl.
*G06F 15/16* (2006.01)

(52) U.S. Cl.
USPC .......................... 709/204; 709/232

(58) Field of Classification Search
USPC ................ 709/201–207, 217–219, 230–232, 709/235–237; 707/609–615, 622, 624, 625, 707/633, 634, 637, 802, 807–809, 827, 828
See application file for complete search history.

(56) References Cited

U.S. PATENT DOCUMENTS

| | | | | |
|---|---|---|---|---|
| 7,130,921 B2 * | 10/2006 | Goodman et al. | ............ | 709/244 |
| 7,379,967 B2 * | 5/2008 | Izutsu et al. | .................. | 709/204 |
| 7,558,797 B2 * | 7/2009 | Li | ...................... | 1/1 |
| 7,613,770 B2 * | 11/2009 | Li | ................ | 709/203 |
| 7,680,937 B2 * | 3/2010 | Miller et al. | .................. | 709/226 |
| 7,734,580 B2 * | 6/2010 | Lahiri et al. | .................. | 707/609 |
| 7,996,876 B1 * | 8/2011 | Everson et al. | ............... | 725/110 |
| 8,073,922 B2 * | 12/2011 | Bates | ........................... | 709/208 |
| 8,116,235 B2 * | 2/2012 | Hu et al. | ...................... | 370/256 |
| 8,122,488 B2 * | 2/2012 | Hoch et al. | ........................ | 726/4 |
| 8,392,604 B2 * | 3/2013 | Ting et al. | ..................... | 709/238 |
| 2003/0028623 A1 * | 2/2003 | Hennessey et al. | ........... | 709/219 |
| 2006/0200736 A1 * | 9/2006 | Smit et al. | ..................... | 715/500 |
| 2008/0133706 A1 * | 6/2008 | Chavez et al. | ................ | 709/218 |
| 2008/0235331 A1 * | 9/2008 | Melamed et al. | ............. | 709/204 |
| 2009/0319502 A1 * | 12/2009 | Chalouhi et al. | .................. | 707/4 |
| 2010/0235432 A1 * | 9/2010 | Trojer | .......................... | 709/203 |
| 2010/0293097 A1 * | 11/2010 | Pomeroy | ......................... | 705/58 |
| 2010/0312817 A1 * | 12/2010 | Steakley | ........................ | 709/202 |
| 2011/0060721 A1 * | 3/2011 | Chalouhi et al. | .............. | 707/622 |
| 2011/0125849 A1 * | 5/2011 | Boyd et al. | .................... | 709/204 |
| 2011/0179328 A1 * | 7/2011 | Souza et al. | ................... | 714/748 |
| 2011/0191420 A1 * | 8/2011 | Painter et al. | ................ | 709/204 |
| 2012/0143986 A1 * | 6/2012 | Robinson et al. | ............. | 709/217 |
| 2012/0233293 A1 * | 9/2012 | Barton et al. | ................. | 709/219 |

OTHER PUBLICATIONS

"Gossip Protocol", Wikipedia®, Mar. 15, 2013, 6 pages, available: http://en.wikipedia.org/wiki/Gossip_protocol downloaded Apr. 16, 2013.

* cited by examiner

*Primary Examiner* — Anh-Vu Ly
*Assistant Examiner* — Phyllis Book
(74) *Attorney, Agent, or Firm* — Hickman Palermo Truong Becker Bingham Wong LLP (57) ABSTRACT

Techniques are described herein for propagating continuously generated data from a seed to a plurality of peers without requiring the seed to send the new data to all peers, and without establishing static sender/receiver relationships between the peers. The data generated by the seed is divided into a number of "windows", where each window is divided into a number of "pieces". The seed sends the data piece-by-piece to different peers. The peer to which the seed sends any given piece may be selected at random. The peers exchange pieces until all pieces of a window are obtained by each peer. When a peer receives all pieces of a window, the pieces are applied at the peer, and the process repeats for the next window.

20 Claims, 8 Drawing Sheets

DATABASE REPLICATION USING COLLABORATIVE DATA TRANSFERS

FIELD OF THE INVENTION

The present invention relates to database replication and, more specifically, to propagating changes made to a primary database using collaborative data transfers.

BACKGROUND

Database replication technology involves propagating changes made to one database to other databases. A common replication configuration involves a single primary database to which changes are made, and multiple standby databases to which those changes are propagated. While write operations are generally only performed on the primary database, read operations may be performed both on the primary database and any of the standby databases.

Figure 1:
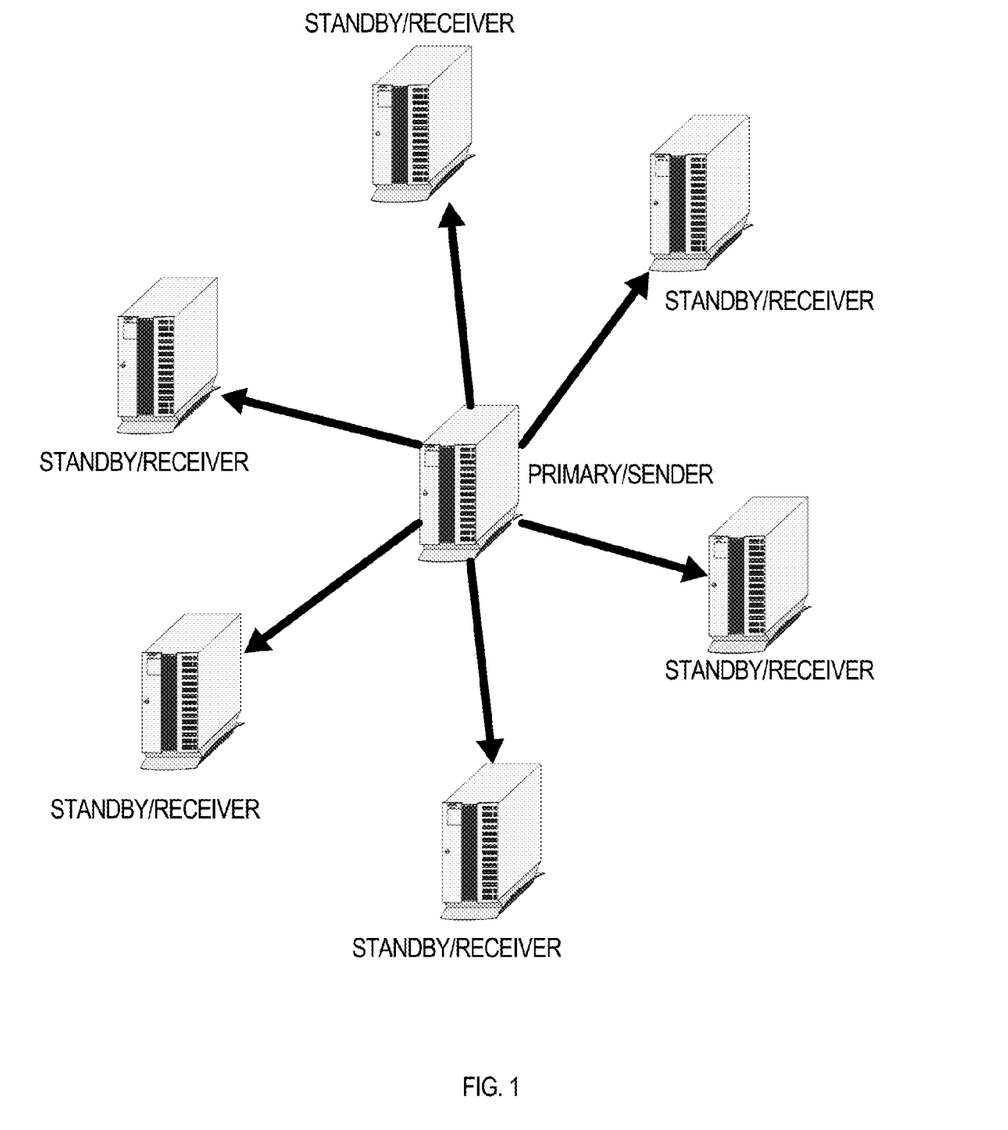
FIG. 1 is a block diagram of a replication system configured to use a single-sender/multiple-receiver approach.

Such one-to-many replication configurations are useful to scale-out beyond the capacity of a single database for read-heavy workloads. Traditionally, in such a configuration, the propagation of changes follows a single-sender/multiple-receiver approach, as illustrated in FIG. 1. Specifically, a sender (the database server managing the primary database) transfers the changes via a dedicated network connection to each receiver (the database servers managing the standby databases).

Unfortunately, the single-sender/multiple-receiver approach to propagating changes has several disadvantages. For example, bandwidth is constrained and typically becomes a bottleneck at the sender. In addition, a single sender opening multiple connections to multiple destinations can lead to extreme CPU load on the sender. Further, receivers may observe high latency due to the limited bandwidth and high load incurred by the sender. Because the limitations of the single-sender/multiple-receiver configuration are exacerbated as new receivers are added to the system, the single-sender/multiple-receiver approach is not scalable.

Figure 2:
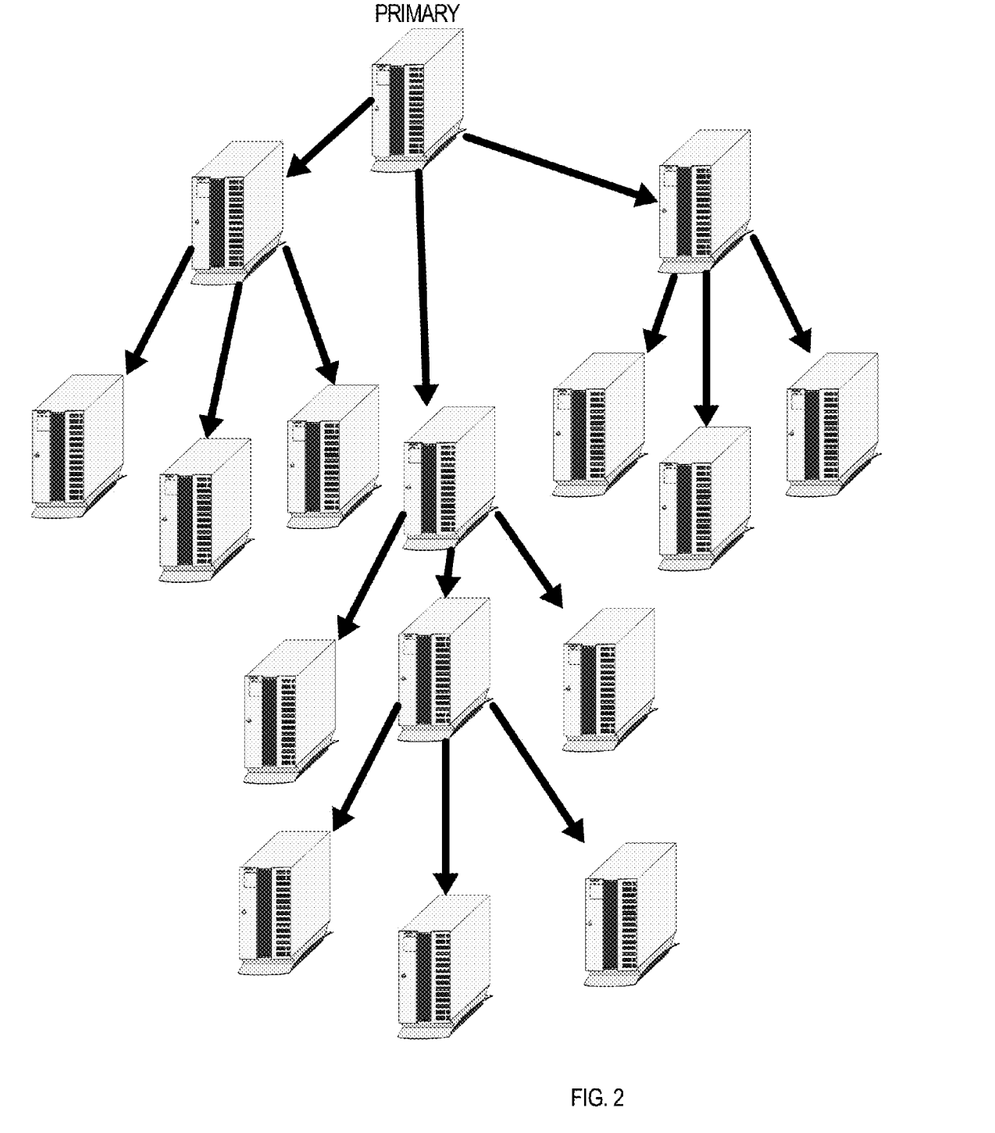
FIG. 2 is a block diagram of a replication system configured to use a cascading configuration approach.

To address some of the problems of the single-sender/multiple-receiver approach, a "cascading configuration" approach has been developed, as illustrated in FIG. 2. In the cascading configuration approach, the primary database is established as the root of a tree-like topology, where each database (starting with the primary database) transmits changes to a fixed number of cascaded destinations. Those cascaded destinations, in turn, transmit the changes to their cascaded destinations, as specified by the tree-like topology. Unfortunately, the cascading configuration approach has the problem of complexity in configuration, as well as limited scalability.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for propagating new data from a "seed" to a plurality of "peers" without requiring the seed to send the new data to all peers, and without establishing static sender/receiver relationships between the peers. The techniques may be used to perform replication across any type of network, including a WAN or LAN. The seed may be any source of any type of substantially continuous data feed that is to be replicated at the peers. For example, the seed may be a video camera that is generating a stream of video data, or an audio recorder that is generating a stream of new audio data. The seed may also be a primary database, where the feed generated by the primary database contains the updates that are made to the primary database as transactions executed against the primary database commit.

The peers may be any entities that maintain replicas of the data contained in the feed produced by the seed. For the purpose of illustration, examples shall be given in which the seed is a primary database, and the peers are standby databases. However, the replication techniques described herein may be employed in any context in which a seed produces a feed of data that is to be replicated across multiple peers.

According to one embodiment, the seed continuously generates data which needs to be sent to all of the peers. The data to be replicated is divided into a number of "windows", where each window is divided into a number of "pieces". The windows and pieces may be of fixed size, or of varying size. Both the seed and the peers maintain connections with each other. When data is generated at the seed, the seed sends the data piece-by-piece to different peers. The peer to which the seed sends any given piece may, for example, be selected at random among all peers to which the seed has a connection.

Among the peers, the pieces of a window are transmitted and received until all peers have received every piece of the window. Within each peer, a window is "closed" when all pieces of the window have been received, and "open" if any piece of the window has not yet been received. The oldest open window within a peer is referred to as the peer's "active" window. When a peer receives the last not-yet-received piece of the active window, that window is closed and the next oldest open window becomes the active window.

Seed Operation

As mentioned above, data from the feed produced by the seed is sent, on a piece-by-piece basis, from the seed to one or more of the peers. The peer(s) to which the seed sends a piece is not dictated by any established static sender/receiver relationships. Rather, the seed may select the peer that receives each piece randomly, on a round-robin basis, or by any other selection mechanism designed to spread the pieces among the various peers.

Figure 3:
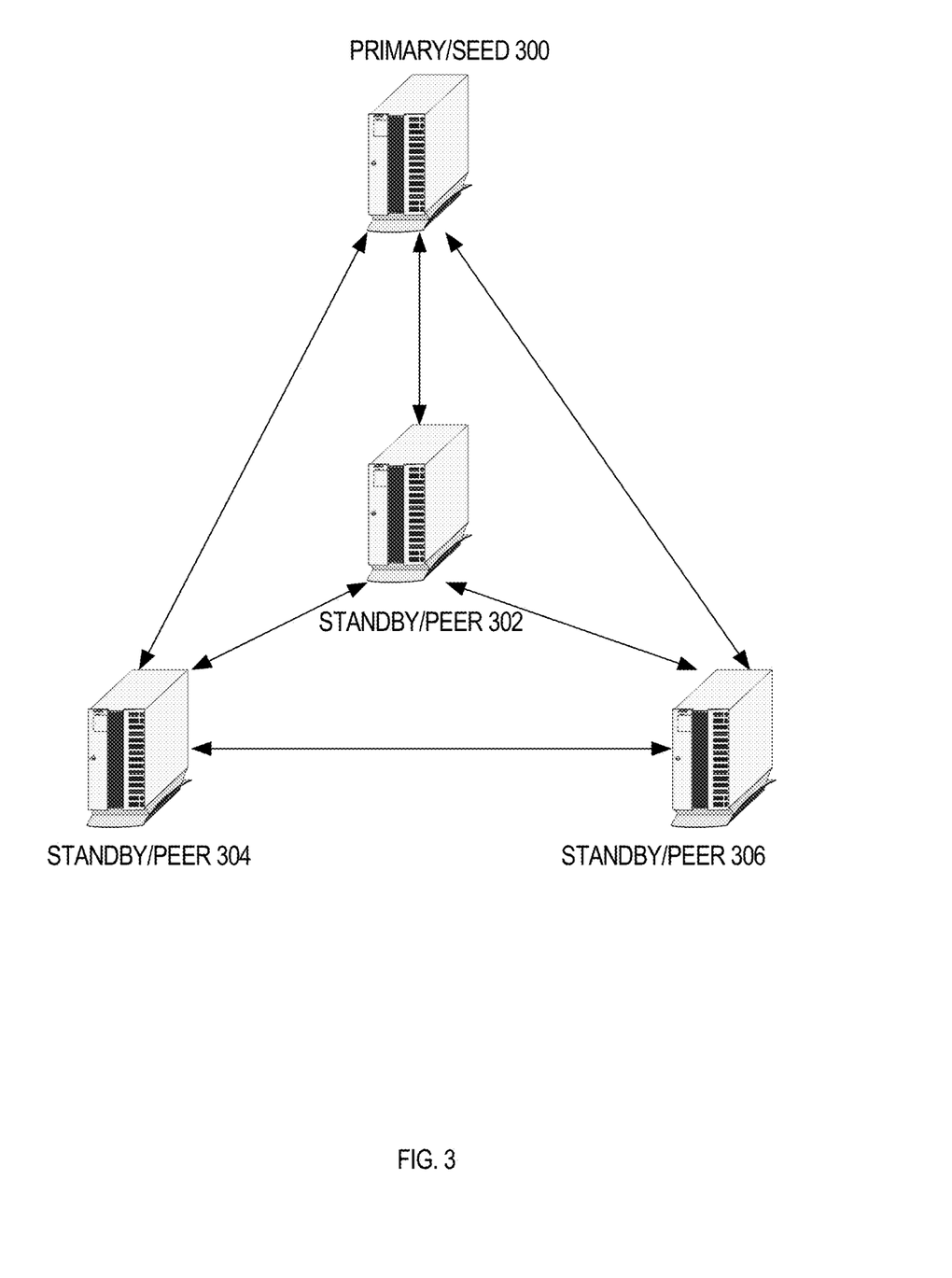
FIG. 3 is a block diagram of a replication system configured to replicate changes without establishing static sender/receiver relationships between the participants, according to an embodiment of the invention.

FIG. 3 is a block diagram that illustrates a system configured to perform replication according to the techniques described herein. In the embodiment illustrated in FIG. 3, a seed 300 is operatively connected to three peers 302, 304 and 306. Each of peers 302, 304 and 306 is also configured to communicate with the other peers. While the seed 300 in the embodiment illustrated in FIG. 3 is configured to communicate with all peers upon which the feed from seed 300 is to be replicated, the techniques described herein may also be employed in situations where the seed is connected to less than all of the peers.

For the purpose of illustration, it shall be assumed that seed 300 has already sent out the pieces of the feed that belong to a window W1, and that those pieces have been replicated across all peers 302, 304 and 306. It shall also be assumed that seed 300 has sent out the pieces of the feed that belong to the next window W2, but those pieces have not yet been replicated across all peers. Rather, it shall be assumed that W2 has been divided into eight pieces (w2p1, w2p2, w2p3, w2p4, w2p5, w2p6, w2p7 and w2p8), and that those eight pieces have been randomly transmitted from seed 300 as follows: Seed 300 sent pieces w2p2, w2p4, w2p5, w2p7 to peer 302. Seed 300 sent pieces w2p3 and w2p6 to peer 304. Seed 300 sent pieces w2p1 and w2p8 to peer 306.

Piece-Tracking Data Maintained by Peers

Figure 4A:
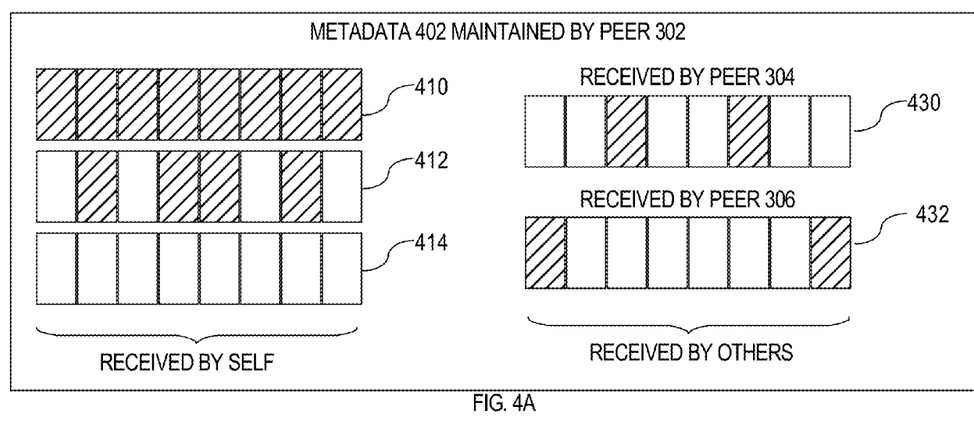
FIGS. 4A-4C are block diagrams of metadata that is maintained at each of the replication peers, to facilitate propagation of changes among the peers to ensure that all peers receive all changes without establishing static sender/receiver relationships between the peers, according to an embodiment of the invention.
Figure 4B:
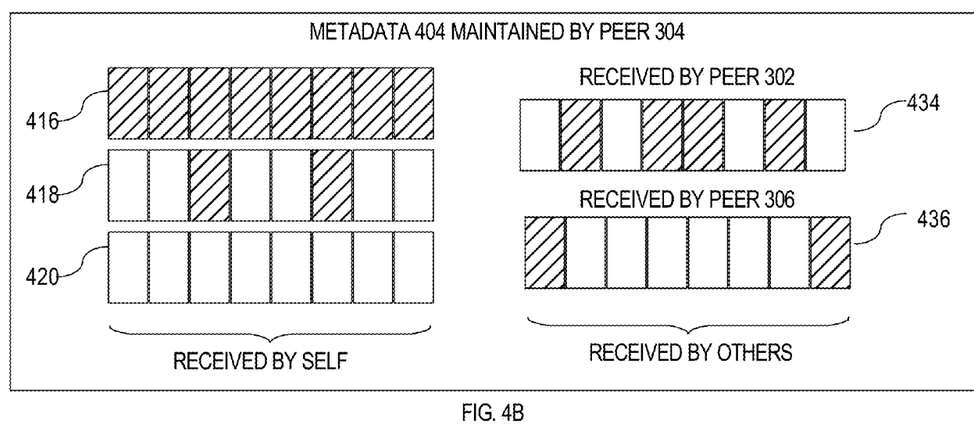
Figure 4C:
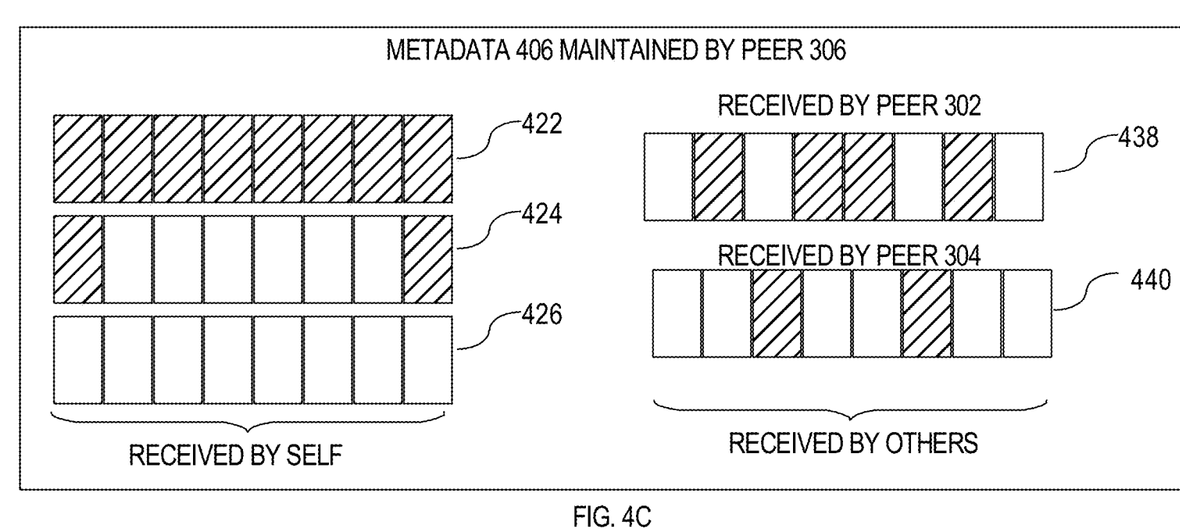

As mentioned above, the pieces that belong to a window are exchanged among the peers until all peers have all pieces of the window. In order to facilitate this exchange, each peer maintains a mapping between the pieces and the peers in the network. FIGS. 4A-4C are block diagrams illustrating the metadata that may be maintained in peers 302, 304, and 306, respectively.

Referring to FIG. 4A, it illustrates piece-tracking metadata 402 that may be maintained by peer 302. The metadata 402 includes metadata that tracks which pieces peer 302 has received, as well as metadata that tracks the pieces that other peers have received. Specifically, metadata 410 corresponds to window W1, and indicates that peer 302 has received all eight pieces of window W1. Metadata 412 corresponds to window W2, and indicates that peer 302 has received pieces w2p2, w2p4, w2p5, w2p7 of window W2. Metadata 414 corresponds to a window W3, which follows window W2, for which peer 302 has not yet received any pieces.

Because all windows prior to W2 are closed, and peer 302 has not yet received all pieces of W2, W2 is the active window for peer 302. As illustrated in FIG. 4A, peer 302 maintains metadata that indicates which peers have the pieces of the active window. Specifically, metadata 430 indicates that peer 304 has pieces w2p3 and w2p6 of window W2. Similarly, metadata 432 indicates that peer 306 has pieces w2p1 and w2p8 of window W2.

Similar to peer 302, peer 304 maintains piece-tracking metadata that tracks the pieces that it has received, and the pieces that other peers have received. The metadata 404 maintained by peer 304 is illustrated in FIG. 4B. Specifically, metadata 416, 418 and 420 respectively show the pieces received by peer 304 for windows W1, W2 and W3. Metadata 434 and 436 respectively indicate the pieces of the active window W2 received by peers 302 and 306.

The metadata 406 maintained by peer 306 is illustrated in FIG. 4C. Specifically, metadata 422, 424 and 426 respectively show the pieces received by peer 306 for windows W1, W2 and W3. Metadata 438 and 440 respectively indicate the pieces of the active window W2 received by peers 302 and 304.

The piece-tracking metadata maintained by the peers may be implemented in a variety of ways. For example, according to one embodiment, the piece-tracking metadata is maintained as a bitmap, where each bit represents a piece. The bitmap is of size "windowsize" and is also associated with an offset that indicates the start of the current window. The high bit in the first byte of the bit-map corresponds to the piece having sequence number offset and so on, so that the last piece has sequence number <offset>+windowsize−1. A set bit indicates an available piece (a piece that has been received by the peer that is maintaining the metadata) and a cleared bit indicates a missing piece.

In such an embodiment, each peer maintains a bitmap corresponding to the pieces it has available (called Piece Window). Only when all the pieces in the Piece Window have been received (piece offset to <offset>+windowsize−1) is the Piece Window advanced (offset is now moved to <offset>+windowsize), thereby establishing the next window as the "active" window.

Each peer also continuously keeps track of the current Piece Window of every other peer in the network thereby having knowledge of the overall state of the network. Thus each peer by requesting missing pieces of data from other peers participates in a collaborative data transfer across all the nodes in the replication network. Ultimately, the protocol ensures that the whole data set is replicated across all the peers (e.g. all standby databases).

Peer-to-Peer Transfers of Pieces

As illustrated in FIGS. 4A-4C, each peer maintains information about pieces received by other peers. According to one embodiment, each peer informs each other peer about which pieces it has received. According to one embodiment, each peer sends these pieces-available messages when it receives any piece, whether from the seed or from another peer, and whether for the active window or for a window that follows the active window. In yet another embodiment, each peer sends to all other peers information about the pieces of the new active window it has received from seed 300, in response to closing of the previous window and making the next window the new active window. Based on these pieces-available messages, each peer updates its metadata about which peers have which pieces, and then uses that metadata to determine which pieces to request, and from which peers to request them.

For example, FIGS. 4A-4C illustrate the situation after each peer 302-306 has received pieces-available messages from each other peer for the pieces of W2 received from the seed 300, but has not yet requested any pieces of W2 from any other peer. For the purpose of illustration, it shall be assumed that, after receiving these pieces-available messages from peers 304 and 306, peer 302 requests piece w2p3 from peer 304. When peer 302 receives piece w2p3 from peer 304, peer 302 updates its metadata to indicate that it now has piece w2p3, and sends a corresponding piece-available message to all peers 304 and 306 to communicate to those peers that peer 302 now has w2p3.

In an alternative embodiment, rather than send the piece-available message to all peers, a peer that receives a piece may send a piece-available message for that piece to only those peers that do not already have that piece available. Sending the piece-available message only to the peers that do not have the piece in question reduces the number of piece-available messages that need to be sent, while still informing those peers that will eventually need to request the piece.

Figure 5A:
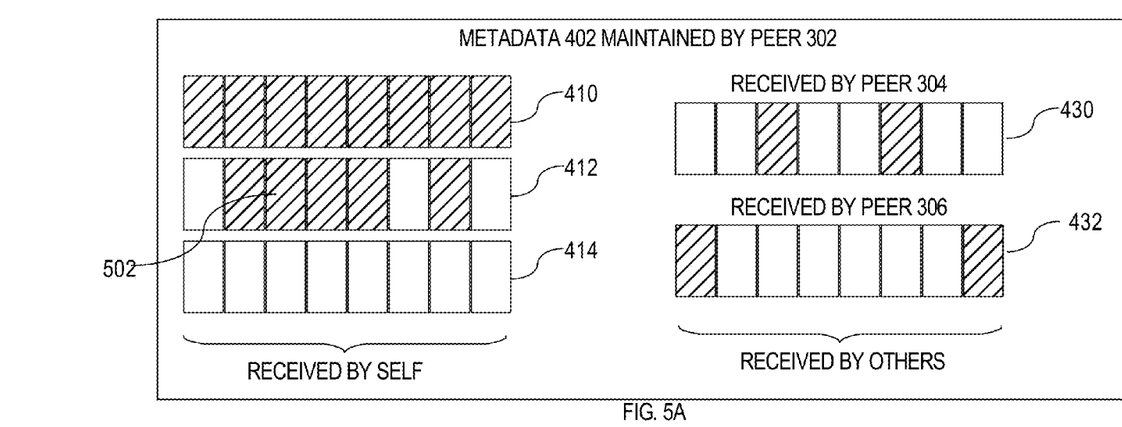
FIGS. 5A-5C are block diagrams that illustrate how metadata is updated in each of the peer in response to one peer receiving a piece from another peer, according to an embodiment of the invention.
Figure 5B:
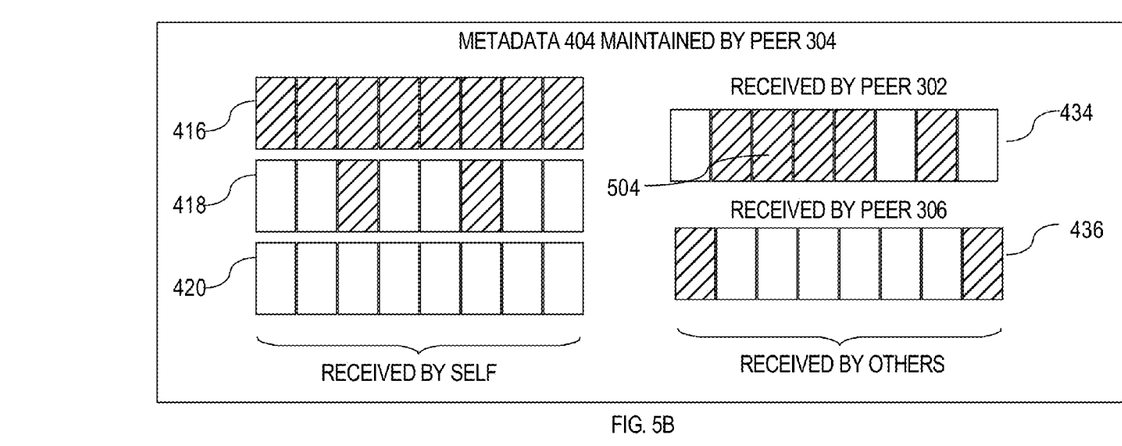
Figure 5C:
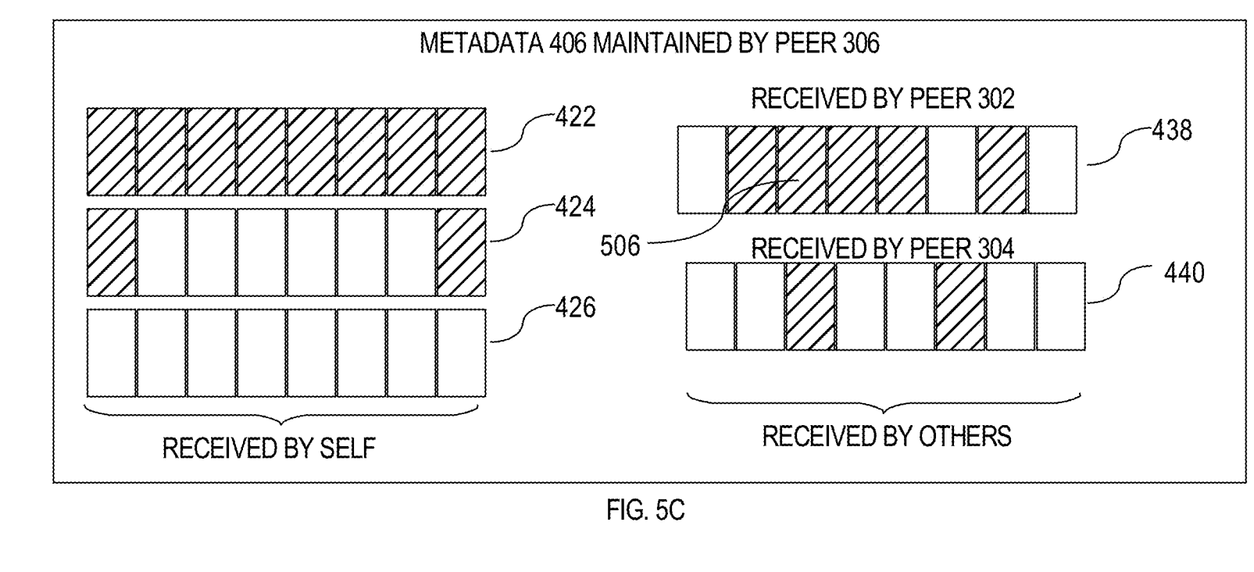

In response to receiving this new piece-available message from peer 302, each of peers 304 and 306 updates its metadata about which pieces are available from peer 302. After this exchange of messages, the metadata maintained by the various peers has been updated as illustrated by set bits 502, 504 and 506 in FIGS. 5A-5C.

Peers 304 and 306 engage in the same process of requesting from other peers the pieces of the active window that they have not yet received, and informing all other peers when they receive pieces. Using this protocol, all peers will eventually have all pieces of the current window.

Selecting which Piece to Request

As explained above, each peer requests pieces from other peers until it has all pieces of the current window. Rather than requesting all missing pieces at once, each peer may be configured to request missing pieces one-by-one, or in batches. In embodiments where peers do not request all missing pieces at once, various techniques may be used by a peer to select which piece or batch of pieces to request.

In one embodiment, peers select which pieces to request using a "rarest first" approach. In a rarest first approach, peers select which missing piece to request based on how many other peers have each missing piece. For example, assume that peer 302 is only missing three pieces A, B and C of the active window, and that pieces A and C are available from both peers 304 and 306, while piece B is available only from peer 304. In this example, peer 302 would choose to request piece B, because it is available from the least number of peers.

A variety of approaches may be used when selecting which piece to request when there are multiple "rarest" pieces. In one embodiment, each peer can be configured to select randomly among the rarest missing pieces. For example, at the time illustrated in FIGS. 4A-4C, all pieces of the active window W2 are equally rare, since each piece of W2 is available from only one peer. Under these circumstances, peer 302 may randomly select to request w2p3 from peer 304, peer 304 may randomly select to request w2p2 from peer 302, and peer 306 may randomly select to request w2p7 from peer 302.

Requesting pieces using the rarest-first approach has the benefit of proliferating the pieces at approximately the same rate among the peers. Using the rarest-first approach tends to avoid bottlenecks, such as would occur if large number of peers are missing only one piece, and that piece is available at only one peer.

Selecting Among Peers

Once a peer has selected which missing piece of the active window to request, the peer requests the missing piece. However, in some situations, the missing piece may be available from multiple peers. In this situation, any one of a number of techniques may be used to select which peer, of the peers that have the missing piece, from which to request the missing piece.

According to one embodiment, the requesting peer randomly selects, from among the peers that have missing piece, which peer to request a piece from. By randomly selecting peers in this manner, it is unlikely that a large number of peers will request the same piece from the same peer, when that piece is available from many peers. In an alternative embodiment, each peer may keep track of which peers it has requested pieces from, and attempt to cycle its piece requests in a round-robin fashion among its peers.

In yet another embodiment, a peer may keep track of the response times that its requests have experienced in the past. When selecting among several peers that have the same missing piece, the peer may request the piece from the peer that has the fasted response times.

Selection among peers may also involve tracking the current workload each peer is experiencing, and requesting the missing piece, from among the peers that have the missing piece, based on which of those peers has the lowest current workload.

Closing a Window

As mentioned above, when a peer has received all of the pieces for the active window, the active window is "closed" and the next window is established as the active window. The next window may be established as the active window by updating the offset into the bitmap that is used to track pieces. A peer may transition to a new active window without respect to which window is the active window at other peers. For example, peer 302 may establish W3 as the active window as soon as peer 302 receives all pieces of window W2, even though W2 may continue to be the active window for peers 304 and 306 because they have not yet received all pieces of W2.

According to one embodiment, the closing of the window also triggers application of the pieces of the window at the peer. For example, in the context of a primary database with multiple standby databases, in response to the database server that is managing a standby database receiving all of the pieces for the currently-active window, the database server applies the entire window of changes to the standby database. After window of changes has been applied, those changes are made available to queries that are executed against that standby database. Applying the data one window at a time, rather than piece-by-piece, significantly reduces the I/O load at each peer without significantly affecting the time at which changes are made available on each peer.

Continuous Generation of Data

According to one embodiment, the seed continuously generates data from the feed, without regard to which data has been applied at the peers. Thus, while the peers are sending requests to each other to obtain all of the pieces for the active window, the seed 300 may continue to send pieces for subsequent window to randomly selected peers. Thus, while peers 302, 304 and 306 are in the process of exchanging pieces of W2 with each other, seed 300 may be sending the pieces of W3 to randomly selected peers.

According to one embodiment, each of the peers keeps track of the pieces it receives from the seed 300 for windows that are beyond the active window, but does nothing else with those windows until they become the active window. For example, while sending requests for missing pieces from window W2, peers 302, 304 and 306 respectively keep track of the pieces of W3 they receive from seed 300 using metadata 414, 420 and 426. Once a peer completes window W2, the peer may begin requesting missing pieces of window W3.

The time at which each peer communicates the pieces of W3 that it has received from the seed may vary from implementation to implementation. For example, in one embodiment, peer 302 sends to all other peers information about the pieces of W3 it has received from seed 300 in response to closing window W2. In another embodiment, each peer may be configured to communicate the pieces of W3 that it receives from seed 300 at the time the piece is received, even though seed 300 may not be done sending out pieces of W3.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
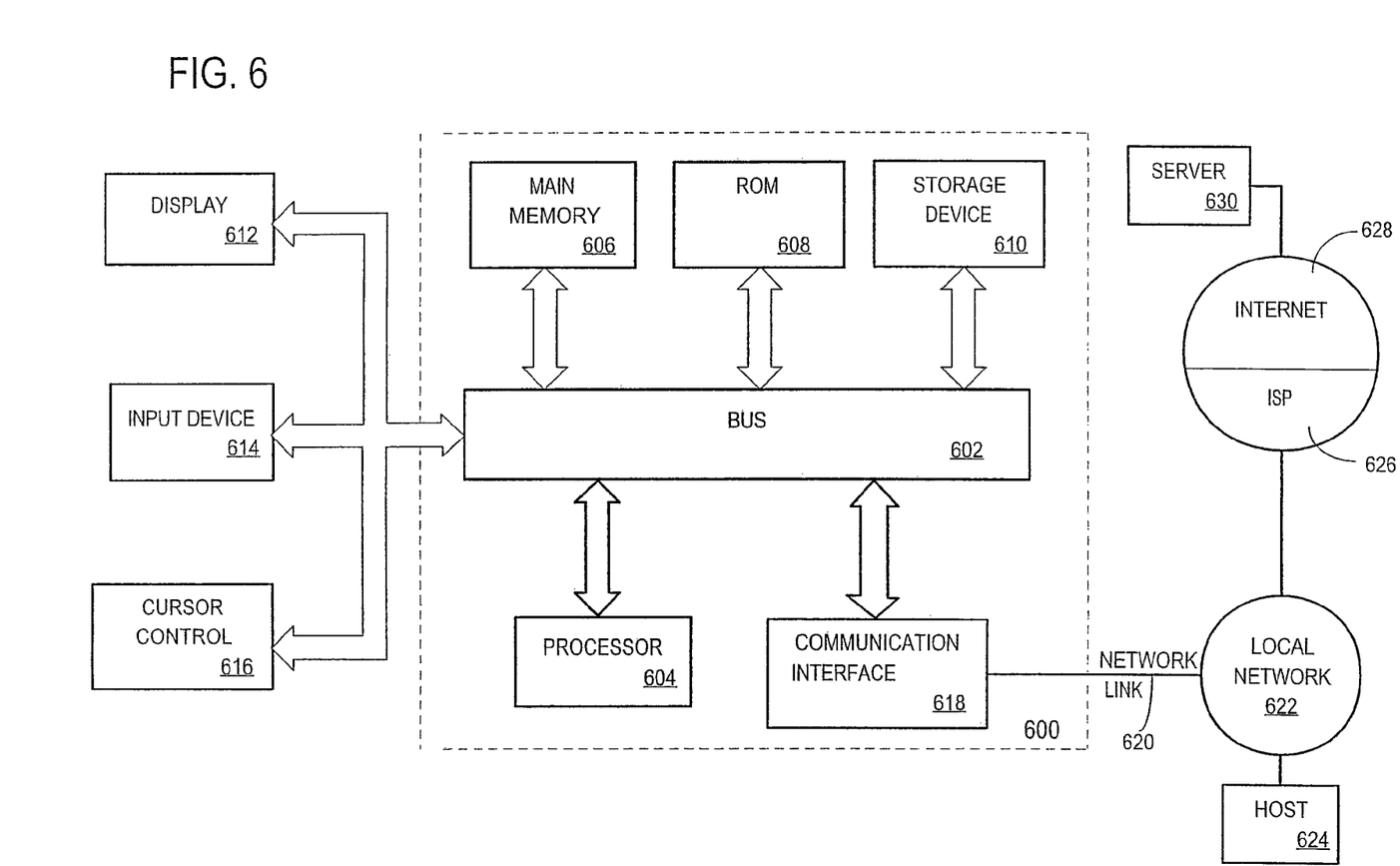
FIG. 6 is a block diagram of a computer system that may be configured to operate as the seed or a peer, according to an embodiment of the invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   causing a seed that continuously generates data to send the data to a plurality of peers;
   wherein the data is divided into windows, and each window is divided into pieces;
   wherein the seed sends the data on a piece-by-piece basis;
   wherein the seed sends each piece to fewer than all of the plurality of peers;
   a) causing each peer of the plurality of peers to maintain metadata that indicates:
      pieces, belonging to an active window, that have been received by the peer from the seed, wherein the active window is a window:
         for which the peer has not received all of the pieces; and
         that has been open longer, within the peer, than any other open window within the peer;
      pieces, belonging to the active window, that are available from each other peer;
   b) based on the metadata, each peer requesting pieces that the peer does not yet have, belonging to the active window, from other peers until each peer has all pieces that belong to the active window;
   c) each peer, in response to receiving a piece belonging to the active window, informing the other peers about having received the piece; and
   d) after a peer has received all pieces of the active window and the active window has been closed, the peer establishing as a new active window, the open window that has been open longer, within the peer, than any other open window within the peer, and repeating steps (a) to (c) for the new active window;
   wherein the method is performed by one or more computing devices.

2. The method of claim 1 wherein the seed sends each piece to one or more randomly selected peers of the plurality of peers.

3. The method of claim 1 wherein the seed sends each piece to exactly one peer of the plurality of peers.

4. The method of claim 1 wherein the seed sends each piece to one or more peers that are selected from the plurality of peers on a round-robin basis.

5. The method of claim 1 wherein each peer applies the pieces that belong to any given window only after receiving all pieces of that given window.

6. The method of claim 1 wherein the seed continues to send pieces for a window that follows the active window to the peers while the peers are exchanging with each other pieces from the active window.

7. The method of claim 1 wherein the seed is a primary database, the data generated by the seed contains changes that are made by transactions executed against the primary database, and the peers are standby databases that maintain replicas of data from the primary database.

8. The method of claim 1 wherein the step of each peer requesting pieces that the peer does not yet have includes each peer:
   determining which piece, that the peer does not yet have, is available from the fewest peers; and
   requesting the piece that the peer does not yet have that is available from the fewest peers.

9. The method of claim 8 wherein, if there is a tie among pieces that are available from the fewest peers, randomly selecting a piece from among the pieces involved in the tie.

10. The method of claim 1 wherein, if the piece that a peer selects to request is available from multiple peers, then the peer selecting randomly which peer, among the multiple peers, from which to request the piece.

11. One or more non-transitory storage media storing instructions which, when executed by one or more computing devices, cause performance of a method comprising:
   causing a seed that continuously generates data to send the data to a plurality of peers;
   wherein the data is divided into windows, and each window is divided into pieces;
   wherein the seed sends the data on a piece-by-piece basis;
   wherein the seed sends each piece to fewer than all of the plurality of peers;
   a) causing each peer of the plurality of peers to maintain metadata that indicates:
      pieces, belonging to an active window, that have been received by the peer from the seed, wherein the active window is a window:
         for which the peer has not received all of the pieces; and
         that has been open longer, within the peer, than any other open window within the peer;
      pieces, belonging to the active window, that are available from each other peer;
   b) based on the metadata, each peer requesting pieces that the peer does not yet have, belonging to the active window, from other peers until each peer has all pieces that belong to the active window;
   c) each peer, in response to receiving a piece belonging to the active window, informing the other peers about having received the piece; and d) after a peer has received all pieces of the active window and the active window has been closed, the peer establishing as a new active window, the open window that has been open longer, within the peer, than any other open window within the peer, and repeating steps (a) to (c) for the new active window.

12. The one or more non-transitory storage media of claim 11 wherein the seed sends each piece to one or more randomly selected peers of the plurality of peers.

13. The one or more non-transitory storage media of claim 11 wherein the seed sends each piece to exactly one peer of the plurality of peers.

14. The one or more non-transitory storage media of claim 11 wherein the seed sends each piece to one or more peers that are selected from the plurality of peers on a round-robin basis.

15. The one or more non-transitory storage media of claim 11 wherein each peer applies the pieces that belong to any given window only after receiving all pieces of that given window.

16. The one or more non-transitory storage media of claim 11 wherein the seed continues to send pieces for a window that follows the active window to the peers while the peers are exchanging with each other pieces from the active window.

17. The one or more non-transitory storage media of claim 11 wherein the seed is a primary database, the data generated by the seed contains changes that are made by transactions executed against the primary database, and the peers are standby databases that maintain replicas of data from the primary database.

18. The one or more non-transitory storage media of claim 11 wherein the step of each peer requesting pieces that the peer does not yet have includes each peer:
    determining which piece, that the peer does not yet have, is available from the fewest peers; and
    requesting the piece that the peer does not yet have that is available from the fewest peers.

19. The one or more non-transitory storage media of claim 18 wherein, if there is a tie among pieces that are available from the fewest peers, randomly selecting a piece from among the pieces involved in the tie.

20. The one or more non-transitory storage media of claim 11 wherein, if the piece that a peer selects to request is available from multiple peers, then the peer selecting randomly which peer, among the multiple peers, from which to request the piece.

* * * * *